Patented Sept. 19, 1950

2,523,252

UNITED STATES PATENT OFFICE 2,523,252

RODENTICIDE COMPOSITIONS COMPRISING PENTAESTERS OF TRIPOLYPHOSPHORIC ACID

Franklin D. Smith, Webster Groves, and John S. Harris, Richmond Heights, Mo., assignors to Monsanto Chemical Company, St. Louis, Mo., a corporation of Delaware No Drawing. Application January 8, 1947, Serial No. 720,937

5 Claims. (Cl. 167—46)

This invention relates to new compositions of matter useful as rodenticides and insectivoricides, more particularly relating to contact and stomach poisons for the effective control and extermination of rodents such as rats, mice, squirrels, rabbits, gothers and prairie dogs, and insectivores such as moles.

There are many poisons and rodenticides on the market, but most all possess the undesirable and dangerous characteristic, that if not entirely consumed by the intended victim, carelessly spilled or otherwise unknowingly left unguarded, the poison remains a serious threat for extended periods to all animals or persons who might inadvertently consume or contact the toxic residue.

The object of this invention is to provide new compositions useful as rodenticides and insectivoricides, a small amount of which is definitely fatal to rodents and insectivores whether taken internally or absorbed through external contact, but possessing the desirable safety feature of hydrolyzing, by reaction with atmospheric moisture over a relatively short period, depending upon the atmospheric humidity, to form relatively non-toxic hydrolysis products.

According to the present invention, generally stated, we have discovered that certain pentaesters of tripolyphosphoric acid, illustrated by the empirical formula $$R_5P_3O_{10}$$

wherein R is a radical containing 1 to 4 carbon atoms selected from the group consisting of alkyl, haloalkyl, alkenyl, or cycloalkyl, are highly desirable as the toxic agents in rodenticide and insectivoricide compositions. We prefer to use the pentaethyl ester of tripolyphosphoric acid in our rodenticide and insectivoricide compositions. For example, it has been found that the lethal dose of pentaethyl tripolyphosphate for rats is 5 milligrams per kilogram of the rodent's body weight, when given orally to the rats in the form of a 2% aqueous solution. In a similar manner, 4.5 milligrams of pentaethyl tripolyphosphate per kilogram body weight, when orally administered as a 1% aqueous solution, is fatal to rats.

When cutaneously applied to rabbits, the lethal dose in all dilutions is approximately 75 milligrams of the pentaethyl tripolyphosphate per kilogram of body weight.

It takes several days of prolonged contact with moisture for the hydrolysis of the toxicant in the composition of the present invention to be complete. This allows sufficient time to poison the rodent or insectivore, but insures that any unconsumed poison will not be available at a later time to inadvertently poison other animals. This hydrolysis reaction may be retarded by combining the toxic material with oils, a process to be fully described in later paragraphs.

While we preferably use the pentaethyl ester of tripolyphosphoric acid in my compositions, the pentaethyl, pentapropyl, pentabutyl and their halogen substitution products exhibit marked toxicity toward rodents and insectivores. In a similar manner the pentaalkenyl esters of tripolyphosphoric acid, such as the pentaacrylyl ester are effective as rodenticides. Likewise, pentacyclopropyl and pentacyclobutyl esters may be used as the lethal agent in the compositions. While we have found that baits or compositions containing 0.3 of 1% to 20% of pentaesters of tripolyphosphoric acid are effective as rodenticides and insectivoricides, and concentrations of ½ to 1% to 10% are equally useful, we prefer concentrations of ½ of 1% to 5% as the range effective for most all rodents and insectivores encountered.

The pentaesters of tripolyphosphoric acid may be prepared in the manner illustrated by the preparation of pentaethyltripolyphosphate: 7 moles of triethylorthophosphate is heated to 150° C., with stirring and refluxing, and slowly in a dropwise manner 2 moles of phosphorus oxychloride is added. The esterification is completed by refluxing at a temperature below 150° C., for 30 minutes after all the phosphorus oxychloride has been added. The reaction product is substantially the pentaethyl ester of tripolyphosphoric acid and may be used as the toxic ingredient of my composition without further treatment. These pentaesters of tripolyphosphoric acid may also be prepared in the manner illustrated by the preparation of the pentamethyl ester of tripolyphosphoric acid: 71 grams of $P_2O_5$ is slowly and with stirring added to 175 grams of trimethylorthophosphate, mole ratio of 2 moles of $P_2O_5$ to 5 moles trimethylorthophosphate, in a water cooled reaction vessel, wherein the reaction temperature is maintained at 50° C., and the stirring continued until all the the $P_2O_5$ has reacted. The reaction product is substantially the pentamethyl tripolyphosphate and may be used as the toxic ingredient of the rodenticide compositions of this invention without further treatment.

The compositions of this invention may be prepared for effective presentation to the rodent in various ways. For example, the pentaester may be mixed with a carrier as edible oils, such as cottonseed oil, soybean oil, corn oil, fish oil, tallow, lard or drippings, or light oils such as mineral oil, and used as such or combined with a food or cereal product such as bread, flour, oatmeal, bran, barley flour or cornmeal, or other meals such as alfalfa or clover meal. The composition with cereals may be used in the meal form or the meal may be pelleted or briquetted for ease in handling, placing, and distribution. As an alternative, the meal may be pelleted and thereafter impregnated with the pentaester or an oil solution thereof.

The preferred method is to prepare an oil concentrate wherein the pentaester of tripolyphosphoric acid selected for the rodenticide or insectivoricide is mixed with one of the above described oils. A bait is then prepared comprising the concentrate which is mixed with or poured over one of the cereal or food products and allowed to soak or steep until all of the oil concentrate is absorbed. A toxic bait which will be effective for several days may be prepared by mixing water and one of the toxic pentaesters of tripolyphosphoric acid and soaking or steeping bread, cereal meal or cereal pellets in the aqueous solution. Also, a toxic oil composition may be prepared and used as an oil rodenticide by mixing 0.5% to 20% of a pentaester of tripolyphosphoric acid with one of the above described oils. Other toxicants may be incorporated in the composition if desired, although the compositions are outstandingly effective without such additional toxicants.

The pentaesters possess such a high toxicity that it is undesirable to attempt to use them as rodenticides or insectivoricides in high concentrations or without the aid of a carrier or diluent. Also at the higher concentrations, the slight odor of the pentaesters becomes more difficult to mask, and the rodents will be repelled rather than attracted to the bait.

The following examples are for the purpose of illustrating the utility and methods of preparing toxic baits for presentation to rodents and insectivores, but it is not intended that the scope of the invention be limited by the examples.

*Example I*

An effective rodenticide and insectivoricide composition may be prepared by mixing together 98.7 grams of corn oil and 1.4 grams (1 ml.) of the pentaethyl ester of tripolyphosphoric acid with sufficient aniseed oil to give the composition a faint odor attractive to rodents. While this composition is a concentrate and is intended to be mixed with other diluents and carriers, it may be used as a rodenticide as such by placing it conveniently for rodent consumption or contact. Concentrates prepared in this manner may contain up to 40 ml. of the pentaesters of tripolyphosphoric acid to 100 grams of oil and still be desirable as a rodenticide and insectivoricide.

*Example II*

The 100 grams of concentrate prepared in Example I is poured over 100 grams of pelleted cereal meal and mixed until all of the oil is taken up by the pellets. The poisoned bait is then placed where it may be conveniently eaten by the rodent or insectivore.

*Example III*

20.0 ml. of pentachlorethyltripolyphosphate is mixed with 98.7 ml. of water to which is added sufficient aniseed oil to mask the faint odor of the phosphate ester. This aqueous mixture is added to 100 grams of cornmeal and mixed well. The aqueous compositions are desirably used as soon as possible after preparation.

*Example IV*

20 ml. of pentaethenyltripolyphosphate is mixed with 98.7 ml. of soybean oil and sufficient aniseed oil to mask the odor of the ester. This oil is then poured over 200 grams of chopped or ground bacon rind, cracklings, or ground meat and mixed well. This is an effective bait for rats and moles.

*Example V*

10 ml. of pentabutyltripolyphosphate is mixed with 85 grams of cottonseed oil to which is added sufficient aniseed oil to mask the faint odor of the phosphate ester. This toxic mixture is then poured over 300 grams of alfalfa meal and mixed until all of the oil is absorbed by the meal. The meal may then be pelleted or briquetted to form an effective bait for rats and moles.

*Example VI*

5 ml. of pentamethyltripolyphosphate is mixed into 95 grams of lard. Sufficient aniseed oil is added to mask the odor of the ester, and the toxic mixture is then spread on to 400 grams of bread.

*Example VII*

5 ml. of pentacyclomethylpropyltripolyphosphate is mixed with 95 grams of a light mineral oil and 400 grams of oatmeal and may be used as an effective rodenticide and insectivoricide.

We claim:

1. A rodenticide and insectivoricide composition comprising a processed solid food product as an edible carrier and as a toxic ingredient, 0.5 to 20% of a pentaester of tripolyphosphoric acid, the said ester residue being a radical containing from 1 to 4 carbon atoms selected from the group consisting of alkyl, chloralkyl, alkenyl and cycloalkyl.

2. A rodenticide composition comprising a processed solid food product and 0.5 to 20% of pentaethyl tripolyphosphate.

3. A rodenticide composition comprising a cereal product and 0.5 to 5% of pentaethyl tripolyphosphate.

4. A rodenticide composition comprising a processed solid food product, an edible oil and 0.5 to 5% of pentaethyl tripolyphosphate.

5. A rodenticide composition comprising a processed solid food product and 0.5 to 20% of penta (chloralkyl) tripolyphosphate.

FRANKLIN D. SMITH.
JOHN S. HARRIS.

REFERENCES CITED

The following references are of record in the file of this patent:

UNITED STATES PATENTS

| Number | Name | Date |
|---|---|---|
| 2,224,695 | Prutton | Dec. 10, 1940 |

FOREIGN PATENTS

| Number | Country | Date |
|---|---|---|
| 333,216 | Great Britain | Aug. 6, 1930 |

OTHER REFERENCES

B. I. O. S. Final Report No. 1095, published in London, March 24, 1947, pages 21, 22.

Chem. and Eng. News, September 10, 1945, pages 1520–1521.

Adler et al., Chemical Industries, vol. 51, October 1942, page 516.